United States Patent
Huang et al.

(10) Patent No.: US 9,360,357 B2
(45) Date of Patent: Jun. 7, 2016

(54) MICROMACHINED MASS FLOW SENSOR WITH CONDENSATION PREVENTION AND METHOD OF MAKING THE SAME

(71) Applicants: Liji Huang, San Jose, CA (US); Chih-Chang Chen, Cupertino, CA (US)

(72) Inventors: Liji Huang, San Jose, CA (US); Chih-Chang Chen, Cupertino, CA (US)

(73) Assignee: Wisenstech Ltd., Santa Clara, CA (US)

( * ) Notice: Subject to any disclaimer, the term of this patent is extended or adjusted under 35 U.S.C. 154(b) by 240 days.

(21) Appl. No.: 13/847,045

(22) Filed: Mar. 19, 2013

(65) Prior Publication Data

US 2014/0283595 A1  Sep. 25, 2014

(51) Int. Cl.
G01F 1/699 (2006.01)
G01F 1/684 (2006.01)
G01F 1/692 (2006.01)

(52) U.S. Cl.
CPC .............. *G01F 1/699* (2013.01); *G01F 1/6845* (2013.01); *G01F 1/692* (2013.01)

(58) Field of Classification Search
CPC ....................................................... G01F 1/699
See application file for complete search history.

(56) References Cited

U.S. PATENT DOCUMENTS

| | | | | |
|---|---|---|---|---|
| 2008/0148842 A1* | 6/2008 | Oda | | 73/204.26 |
| 2009/0049907 A1* | 2/2009 | Wu et al. | | 73/204.26 |
| 2009/0205417 A1* | 8/2009 | Opitz | | G01F 1/6986 73/204.26 |
| 2011/0030468 A1* | 2/2011 | Chen | | G01F 1/692 73/204.26 |

* cited by examiner

*Primary Examiner* — John Fitzgerald
*Assistant Examiner* — Herbert K Roberts (57) ABSTRACT

The design and manufacture method of a silicon mass flow sensor made with silicon micromachining (a.k.a. MEMS, Micro Electro Mechanical Systems) process for applications of gas flow measurement with highly humidified or liquid vapors is disclosed in the present invention. The said silicon mass flow sensor operates with an embedded heater and an adjacent control temperature sensor beneath the integrated calorimetric and thermal dissipative sensing thermistors. When the condensation takes place at the surface of the said silicon mass flow sensor, the embedded heater shall be turned on to elevate the temperature of the supporting membrane or substrate for the sensing thermistors. The elevated temperature shall be adjusted to above the vaporization temperature with the feedback data of the adjacent temperature sensor such that the surface condensation due to the presence of the liquid vapors in a gas flow can be effectively eliminated.

9 Claims, 6 Drawing Sheets

MICROMACHINED MASS FLOW SENSOR WITH CONDENSATION PREVENTION AND METHOD OF MAKING THE SAME

BACKGROUND OF THE INVENTION

1. Field of the Invention

This invention relates to micromachined silicon sensors or Micro Electro Mechanical Systems (MEMS) mass flow sensing technology that measures the quality of gases. The present invention also relates to thermal mass flow sensors of such gases. This invention additionally provides the design and make of a micromachined mass flow sensor. The present invention specifically relates design and process of making the same for a mass flow sensor for preventing of liquid vapor or liquid condensation of such sensors that will be used to measure the flow at a highly humidified gas medium.

2. Description of the Related Art

Micromachined mass flow sensors (aka silicon flow sensors) are generally made on silicon wafers, and have been widely applied in the past decades in medical, automotive, and many other industries where clean and dry gas flow measurements are demanded for high accuracy, low cost and enhanced performances at a small form factor and low power. Examples are medical anesthesia gas control, personal ventilators, air intake of automotive electronic control units, and gas chromatography mass spectrometry. One of the earlier makes of silicon flow sensors is disclosed by Higashi et al. (Higashi. R. E. et al., Flow sensor, U.S. Pat. No. 4,501,144, Feb. 26, 1985) of Honeywell for a small footprint silicon flow sensor that has its binding wires to the control electronic interface exposed to the flow medium which limited the applications to clean, non-conductive and dry gases. Ueda et al. (Ueda. N. and Nozoe, S., Flow rate measuring device, US Patent Application 2008/0314140) and Fujiwara et al., (Fujiwara, T.; Nozoe, S. and Ueda, N., Flow velocity measuring device, U.S. Pat. No. 7,062,963) of Omron designed a complicated by-pass segregation channel to avoid the damages from impact of particles in the fluid with tiny particles as well as clogging of the flow channels. These mechanical package designs however did not change the basic performance of the silicon flow sensor as the conductive or high humidified fluids could easily destroy the sensor chip by shorting the wires. Additional clogging with liquid condensation would also take place in cases that the fluid has the liquid vapor or is highly humidified. Mayer et al. (Mayer. F. and Leaner, M., Method and sensor for measuring a mass flow, U.S. Pat. No. 6,550,324) teach an integrated MEMS mass flow sensor chip using thermal pile sensing elements and CMOS integrated signal processing circuitry that seals the wire from the contact of the flow fluids but limited the flow channel size to within 2 mm in diameters by the geometry of the sensing chip. In another disclosures by Hecht et al, (Hecht. H. et al., Method for correcting the output signal of an air mass meter, U.S. Pat. No. 5,668,313) and Wang et al., (Wang, G. et al., Micro Machined mass flow sensor and insertion type flow meters and manufacture methods, U.S. Pat. No. 7,536,908), the silicon mass flow sensors were designed without on chip electronics and the sensor size is elongated such that the wire connections to the electronics interface could be completed sealed at one end of the silicon flow sensor chip and the sensor could be packaged into a formality of a probe that could be inserted into a flow channel of arbitrary sizes that is calibrated together for the performance. However, because of the nature of the direct, contact of the silicon flow sensor chip with the flow fluids during the operation, the fluid with vapors or highly humidified gas flow medium will still significantly affect the flow readout as the flow medium characters would be significantly deviated, from those at the calibration. Application examples for these type of flow media are commonly seen in human respiratory, vaporized carbon dioxide for beverage and food, to name a few. Bonne and Satren (Bonne, U. and Satren, E., Sensor package for harsh environments, U.S. Pat. No. 6,911,894) and Mayer et al. (Mayer. F., Honing, R. and Vanna, S., Flow sensor, U.S. Pat. No. 6,813,944) revealed a similar structure that places the silicon flow sensor chip outside the flow channel to avoid the direct contact of the silicon flow sensor chip with the flow fluids. This structure can also be used in liquid fluid flow measurement therefore it is an effective approach for maintaining the sensor performance in a fluid with vapors or highly humidified flow medium. Nonetheless, the design limits the flow channel dimensions to be within, a few mini-meters because of the small foot print of silicon flow sensors, which in return restrict the applications only for very small flow measurement applications. In addition, because of the small power of the silicon flow sensors, the package or flow channel material directly in contact with the sensor must have superior thermal transfer properties that also limits the package options and results in a high cost for the products. Alternative operation of the silicon sensor at an elevated current or high power of the micro-heater to avoid the sensor deviation in performance for flow fluids with vapors or high humidity as proposed for the thin film or hot wires flow sensors (Eirnsnf, K., Ullrich, K. and Muziol, M., Flow sensor element and its self-cleaning, U.S. Pat. No. 7,739,908) is often difficult since the high current or high power could expose the silicon flow sensors to volatility during performance. Further, the continued operation of the silicon flow sensor in a fluid with vapors or high humidity would eventually leads to silicon flow sensor surface condensation as the desired low micro-heater power would not be sufficient to expel the vapor accumulation that would result in sensor malfunction or significant deviations in flow read out.

Therefore it is desired to have a completed new design or disclosure of a silicon flow sensor that shall perform in a fluid with vapors or high humidity. This sensor shall be able to continue working in such environments and maintaining good accuracy and reliability. The desired silicon flow sensor shall also keep its small foot prints while could be operated at a low power configuration. Further there should not be any limitations for the desired silicon flow sensors that shall be able to be packaged for arbitrary flow channel sizes and performed in any fluid properties.

SUMMARY OF THE INVENTION

It is the objective of this invention to provide the design and process of a silicon gas mass flow sensor that shall have the capability of nonstop performing when measuring a flow medium with heavy presence of humidity or water droplets or other liquid vapors. In addition, the said silicon mass flow sensor can from time to time self-check and provide information timely via the interface. Further this invention disclosed the detailed process for the said silicon mass flow sensor.

In one preferred embodiment, the invented silicon mass flow sensor shall have all the capability of a mass flow sensor that can be used for measurement of gas mass flow or flow speed. It shall utilize both of the calorimetric and thermal dissipative measurement principle and therefore have an extended measurement range while maintaining the sensitivity for low flow measurement that shall be suitable for a variety of applications after being properly packaged.

In another preferred embodiment, the invented silicon mass flow sensor is particularly suitable for applications where the flow medium is highly humidified or with water droplets or other liquid vapors. The accomplishment of the capability that the said silicon mass flow sensor can perform in the said flow medium is via the elevating the substrate temperature beneath sensing elements such that the water droplets or liquid vapors shall be converted into a gaseous phase avoiding condensation on the surface of the sensing elements. The elevation of the substrate temperature shall not have any impact onto the silicon mass flow sensor sensing capability as the calorimetric measurement principle depending on the differential temperature between up and down stream temperature filed that can be automatically maintained in the constant temperature mode with the feedback loop from the independent temperature measurement by the sensing element located on the same MEMS chip but away from the central micro-heater that provides the heat source for the measurement. Further the thermal dissipative measurement is also dependent on the flow medium properties regardless of the background or substrate temperature. Therefore the embedded capability beneath the sensing elements shall not alter the measurement sensitivity but it shall prevent the water or liquid vapor condensation on the sensing elements.

In another preferred embodiment, the major role of the invented MEMS mass flow sensor with embedded substrate temperature elevation capability is to ensure the said silicon mass flow sensor performance at highly humidified flow medium or flow medium with water droplets or other liquid vapors. The said temperature elevation capability can be automatically triggered when the said mass flow sensor detects the presence of condensation on the surface of the sensing elements. For this purpose, a temperature sensor is integrated with the heating elements beneath the sensing elements. When the surface of the sensing elements is free from condensation, the temperature sensor beneath the sensing, elements shall be the same for the temperature preprogrammed for the micro heat source. The substrate temperature elevation function shall then be remaining at the off status. When the condensation is present on the surface of the sensing elements, the temperature shall have a sharp drop at which the substrate temperature elevation function shall be set to on status and the exact temperature of the substrate can be automatically adjusted until the condensation is no longer detectable.

In another preferred embodiment, the invented silicon mass flow sensor shall have the sensing elements constituent of a micro-heater that provides the heat sources for the measurement and a pair of temperature sensors placed up and down stream of the micro-heater, preferably in symmetrical positions. To further conserve the energy necessary for the operation, the up and down stream temperature sensors can be in the form of a thermal couple that does not require external electrical current. A separate temperature sensor shall be placed away from the micro-heater, preferably on the silicon substrate, such that the actual temperature of the flow medium can be accurately measured providing the feedback to the electrical supply to the micro-beater such that a constant temperature or constant power mode of the micro-heater can be achieved.

In another preferred embodiment, the sensing elements shall be constituent of stable metals such as platinum or doped polycrystalline silicon. Alternatively, in order to maximize the sensitivity of the said silicon mass flow sensor, the up and down stream sensing elements can be constituent of it material that is different from the micro heater. The selection of the sensing elements shall be prioritized for materials with large temperature coefficient whilst the selection of materials for the micro heater shall be such that the micro heater shall have the optimal efficient air heating capacity or power. Further the heating area shall be confined within a defined area with regard to the sensing elements such that the best resolution can be achieved. The heat isolation can be obtained by open slots around the micro heater where the gas medium can serve as the best isolation for confining the temperature field.

In another preferred embodiment, the temperature elevating capability of the substrate beneath the sensing elements shall be constituent of a heating source made of a material with high heating efficient such as tungsten integrated together with a temperature sensor such that the desired temperature can be controlled precisely. The temperature sensor can be made of platinum or doped polycrystalline silicon for best performance. The shape of the heating source or the heater shall be preferably in the parallel wires or a non-uniform spiral or other geometries such that it can provide the homogenous temperature distribution beneath the sensing elements. The temperature shall also provide feedbacks to the external control circuitry such that a constant temperature of the heated substrate can be maintained that shall also be above the liquid vaporized temperature. In addition, the temperature sensor also detects the surface condensation threshold by comparing the measured temperature to that preprogrammed for the micro heater that provides the heat source for the mass flow measurement.

In yet another preferred embodiment, the said silicon mass flow sensor shall be manufactured with a silicon micromachined process with the key steps of the thermal isolation provided by deep reactive ion etching that creates the suspended membrane comprising of the membrane heater and control temperature sensor, sensing elements as well as the micro heater that provides the heat source for the mass flow measurement. The micromachining process also provides the heat isolation for the micro heater in the central position with respective to the up and down stream sensing elements. Further the process shall be invented for the multilayered stacked material stress management of the suspended membrane having the above said elements isolated or separated and passivated by the isolation materials such as silicon nitride or silicon carbide.

For the gas mass flow with liquid vapors, this invention provides a solution for accurate measurement of the flow rate or flow speed when other measurement technologies are not able to perform. The said invention is a small thrill factor with low power requirement that is capable for applications with different package or assemble requirements. This invention will no doubt become apparent to those skilled in the art after reading the following detailed description of the preferred embodiments that are illustrated in the accompanying drawings.

DETAILED DESCRIPTION OF THE PREFERRED EMBODIMENTS

Figure 1:
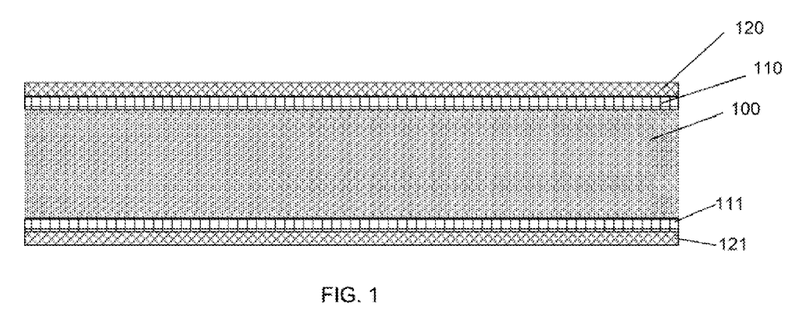
FIG. 1 is the side cross-sectional view of the silicon substrate with passivation and mask layers for the said invention.

The preferred micromachining process for making of the said invention starts from the preparation of the isolation cavity process mask and process stop (110 and 111) on the single crystal silicon substrate (100) with a thickness from 0.35 to 0.50 mm. Then the process is formed by the membrane formation for supporting the sensing, elements and the said heat source (120) as shown in FIG. 1. The isolation cavity process mask and process stop (110 and 111) can be made of silicon oxide via thermal oxidization growth in an oven with a thickness of 100 to 300 nm but preferably 150 nm. The membrane material is usually selected to be polyimide or silicon nitride for its mechanical strength. The polyimide membrane is made via spin coating with a thickness of 2 to 8 micro meters. The silicon nitride is preferably made via the low pressure chemical vapor deposition (LPCVD) process with a thickness from 800 to 2000 nm but preferably of 1000 to 1200 nm for the management of the total membrane stress and the mechanical robustness of the membrane.

Figure 2:
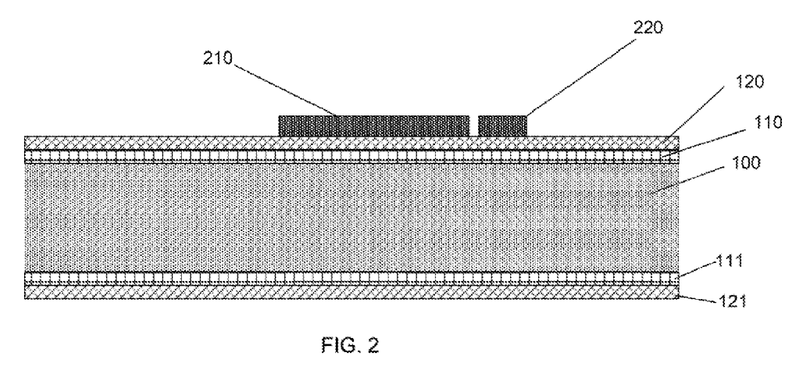
FIG. 2 is the side cross-sectional view of the said inventions showing the process of deposition of the substrate heat source and the control temperature sensor.

The followed process shown in FIG. 2 is one of the key processes for the said invention. The heat source (210) for elevating the substrate temperature is made via the sputtering or electronic beam evaporation of the heater materials that can be tungsten, platinum or doped polycrystalline silicon. It is preferably to make the heat source by tungsten for its heat efficiency and cost but in case the complete said invention micromachining process needs to be compatible metal on semiconductor process, doped polycrystalline silicon shall be the best choice. The thickness of the said heater can be from 100 nm to 300 nm but preferably 200 nm. The shape of the heater is preferably to be wires in parallel with a wire width of 2 to 8 micrometers but preferably 5 micrometers. The alternative shape of the heater can be spirals with the non-uniform width in order to ensure a homogeneous heat distribution. The said heat source or micro heater shall have the capability to elevate the said membrane temperature above the common liquid vaporization temperature from 100 to 600° C. To precisely control the heater temperature preventing over heat and to minimize the power consumption, a temperature sensor (220) is also integrated close to the heater such that it can provide the feedback for the control of the heater power. The temperature sensor is preferably to be made of platinum for the performance although tungsten or doped polycrystalline silicon can also provide the required information. Further the temperature sensor (220) also serves for the control of the heater operation. The detailed description of this particular function shall be elaborated in the following texts.

Figure 3:
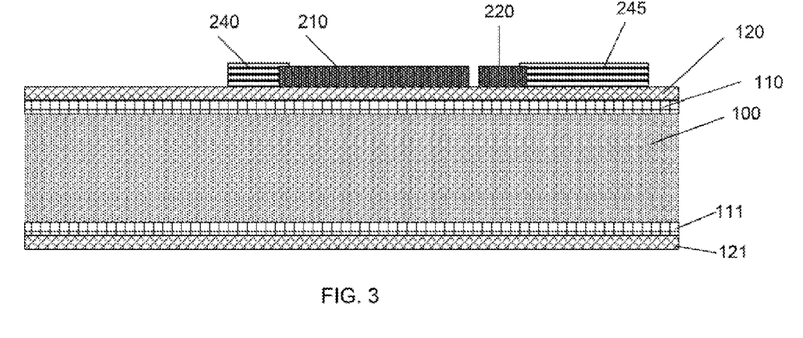
FIG. 3 is the side cross-sectional view of the said invention showing the process of metallization for the substrate heat source and the control temperature sensor.

The connection of the membrane heater (210) as well as the temperature sensor (220) to the external control interface is illustrated in FIG. 3 and is done via the metallization process (240 and 245). The metallization is preferably made of gold via sputter deposition or electronic beam evaporation due to that thin gold films have a small resistance value that shall not have impact on the control electronic circuitry. The preferred thickness of the metallization is 100 to 500 am but most preferably 200 to 250 nm.

Figure 4:
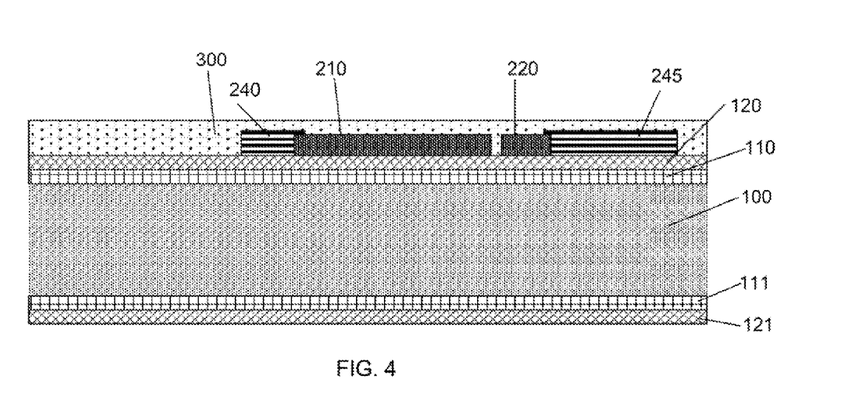
FIG. 4 is the side cross-sectional view of the said invention showing the process of passivation of the substrate heat source and the control temperature sensor.

In FIG. 4, passivation of the membrane heater and the integrated temperature sensor is performed via the deposition of the thermally conductive materials on top of the membrane heater and temperature sensor. The passivation (300) also provides electrical isolation of the membrane heater and the temperature sensor adjacent to the heater. Preferably process of making the passivation is done via the physical vapor sputtering or plasmas enhanced chemical vapor deposition of silicon nitride or silicon carbide with a thickness preferably from 200 to 500 urn bat most preferably 350 nm. In preferably cases, silicon nitride is selected due to lower possibility of sharp particles inclusions during silicon carbide preparation that may yield in this process resulting in difficulties in late process.

Figure 5:
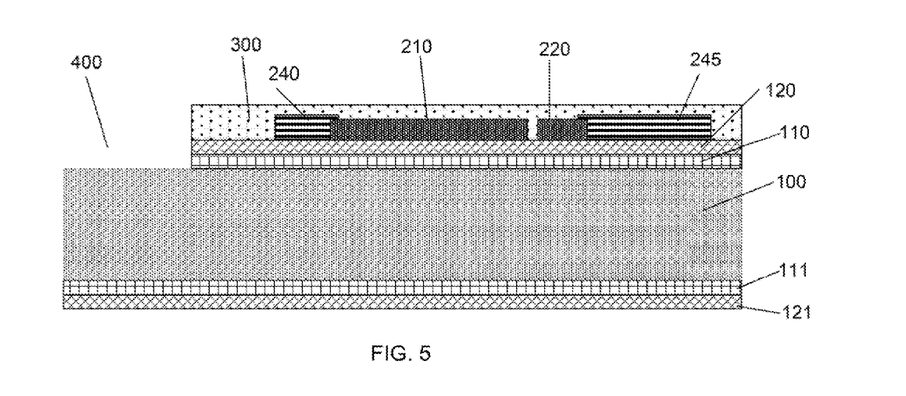
FIG. 5 is the side cross-sectional view of the said invention showing the process of opening of the slot for the deposition of the environmental control temperature sensor.

The sensing elements of the said silicon mass flow sensor contain four thermistors: a micro-heater that generates the temperature field for measurement, a pair of temperature sensors usually placed symmetrically against the micro-heater at the up and down stream position, respectively. This pair of temperature sensors provides the actual measurement data of the flow rate or flow speed. In order to minimize the environmental temperature variation induced measurement errors, it is critical to have a feedback look such that the micro-heater can work in the constant temperature or constant power mode. Therefore a measurement of the environmental temperature is a must. Such a task is achieved by place a fourth thermistor on the same sensor chip but away from the micro-heater to preventing the heating effects. FIG. 5 shows the preparation of the formation of these thermistors. Using the standard reactive ion etching process, the passivation layer (300), membrane (120) and thermal isolation cavity stop layer (110) are removed forming an opening (400) for the thermistor that shall be used for measurement environmental temperature as the silicon substrate has excellent thermal transportation properties.

Figure 6:
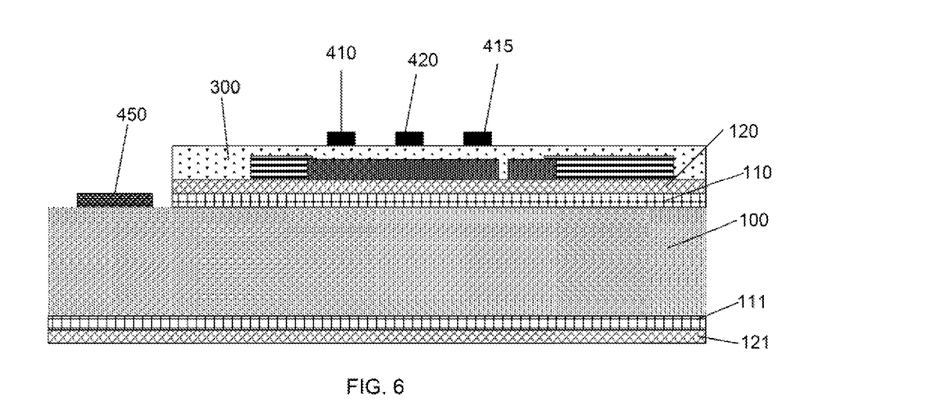
FIG. 6 is the side cross-sectional view of the said invention showing the process of making of the sensing elements including the environmental temperature sensor.

As shown in FIG. 6, the micro-heater (420) and the up and down steam thermistor (410) and (415) as well as the thermistor for environmental temperature data (450) are them made usually via the physical vapor deposition or electronic beam evaporation. The three thermistors (410, 415, and 420) are placed right above the membrane heater and the temperature sensor at the same layer adjacent to the membrane heater. The temperature sensor beneath the micro heater can then also measure the operational temperature of the micro heater. It can then provide the data to the external control circuitry that shall compare the preprogrammed one with the actual measured data. If the measured data are substantially lower than the preprogrammed one, the surface condensation may happen that brings down the temperature around the micro heater. The circuitry can then trigger the commands that shall turn on the membrane heater which in turn provide the necessary heat that shall be able to vaporize the surface condensation materials. On the contrary, once the temperature measured from temperature sensor beneath the micro heater shall be the same as the one preprogrammed for the micro heater, the membrane heater could be turned off in case there is a requirement for power savings, although continuous operation of the membrane heater shall not have any impact for the measurement. It is preferably that these thermistors are all made of stable materials with high sensitivity such as platinum. In cases for compatible metal on semiconductor process the thermistors can be made of doped polycrystalline silicon. For power reductions, the thermistors serve as temperature sensor only (410, 415 and 450), they can be formed in the structure of thermal couples. The thicknesses of these thermistors are preferably 100 to 300 nm but most preferably 200 nm.

Figure 7:
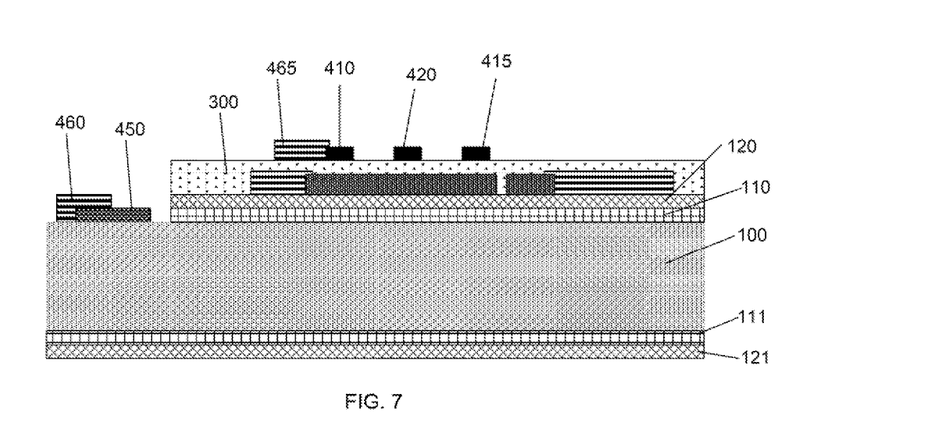
FIG. 7 is the side cross-sectional view of the said invention showing the process of metallization for the sensing elements including the environmental temperature sensor.
Figure 8:
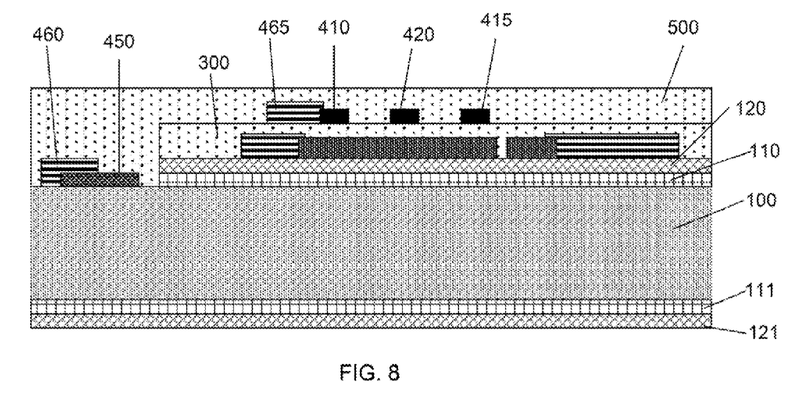
FIG. 8 is the side cross-sectional view of the said invention showing the process of passivation of the sensing elements including the environmental temperature sensor.

The connection of the sensing elements (410, 415, 420 and 450) to the external control interface is illustrated in FIG. 7 and is done via the metallization process (460 and 465). The metallization is preferably made of gold via sputter deposition or electronic beam evaporation due to that thin gold films have a small resistance value that shall not have impact on the control electronic circuitry. The preferred thickness of the metallization is 100 to 500 nm but most preferably 200 to 250 nm. In FIG. 8, passivation of the sensing elements is performed via the deposition of the thermally conductive materials on top of the membrane heater and temperature sensor. The passivation (500) also provides electrical isolation of the sensing elements. Preferably process of making the passivation is done via the physical vapor sputtering or plasmas enhanced chemical vapor deposition of silicon nitride or silicon carbide with a thickness preferably from 200 to 500 nm but most preferably 350 nm. In preferably cases, silicon nitride is selected due to lower possibility of sharp particles inclusions during silicon carbide preparation that may yield in this process resulting in difficulties in late process.

Figure 9:
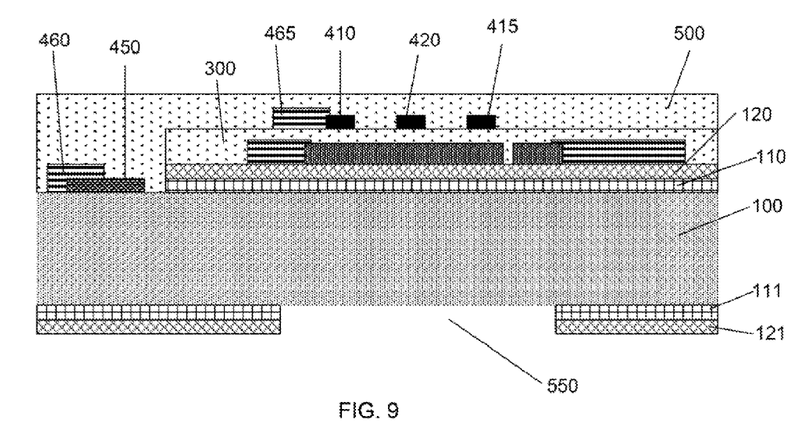
FIG. 9 is the side cross-sectional view of the said invention showing the process of opening of deep reactive ion etching window for the thermal isolation cavity.
Figure 10:
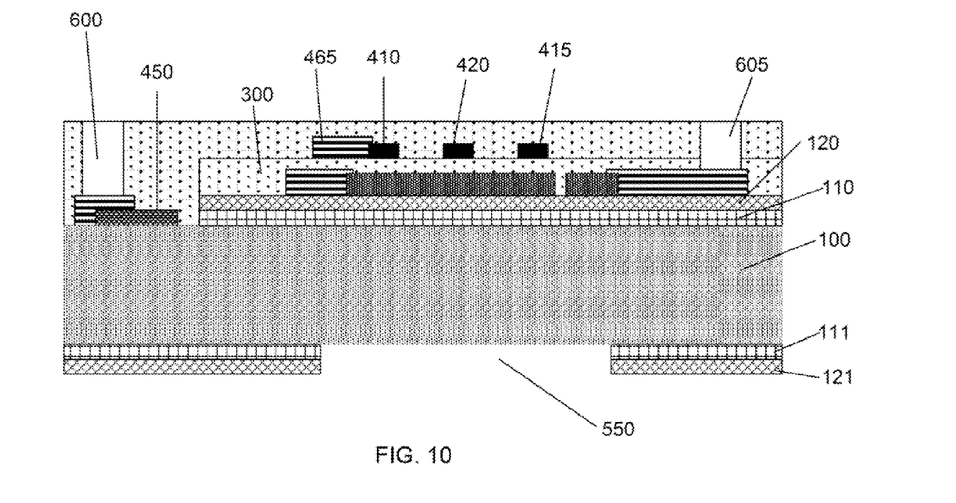
FIG. 10 is the side cross-sectional view of the said invention showing the process of opening the contact to external connections.
Figure 11:
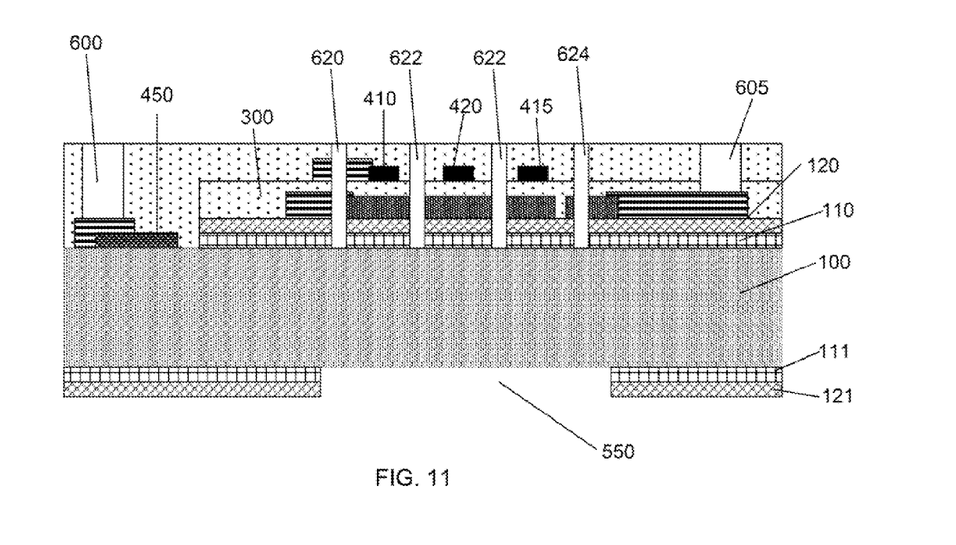
FIG. 11 is the side cross-sectional view of the said invention showing the process of opening the thermal isolation slots for the sensing elements and the micro heater.

FIG. 9 shows the process that makes the window (550) for the making of the thermal isolation cavity beneath the membrane structure. The window is opened by removal of the pre-formed silicon oxide and silicon nitride in the desired location via reactive ion etching. The remaining portion shall serve as the mask for the late process steps of micromachining using deep reactive ion etching process. Before processing to the removal of the hulk silicon materials for the said cavity, FIG. 10 shows the step of opening the contacts for the sensing elements (600), the membrane heater as well as the temperature sensor adjacent to the membrane heater (605). This task again can be achieved by the standard reactive ion etching. These openings exposed the contacts that shall be the interface between the said invention of silicon mass flow sensor and external control electronic circuitry. The followed process shown in FIG. 11 is to form the thermal isolations for the sensing elements on the membrane. In particular, for the micro heater that generates the desired temperature field for the measurements. This process is also performed with the standard reactive ion etching process and the openings shall be filled with flow gas medium that is a natural thermal isolation to confine the temperature filed resulting in excellent resolutions for the measurements. These openings further serves as the gas pressure balancers as the gas shall be also flow into the cavity beneath the membrane through the openings which maintains the flatness of the membrane.

Figure 12:
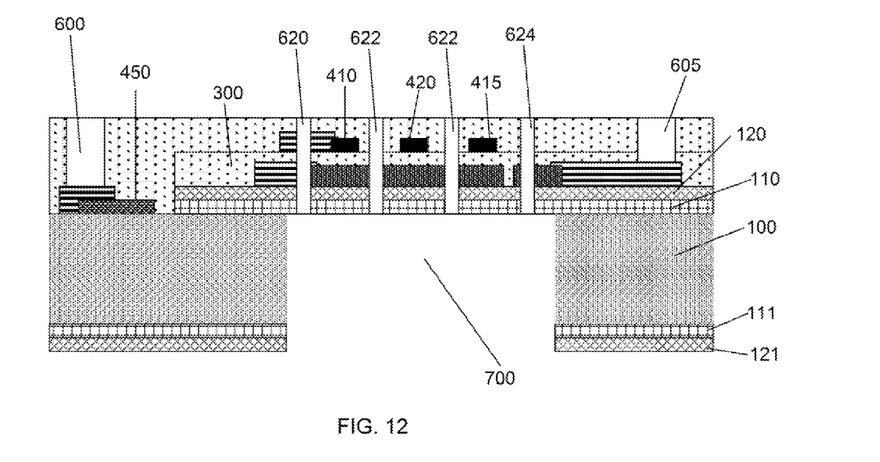
FIG. 12 is the side cross-sectional of the said invention showing the process of milking of the thermal isolation cavity forming the membrane structure that have the sensing elements and the substrate heat source.
Figure 13:
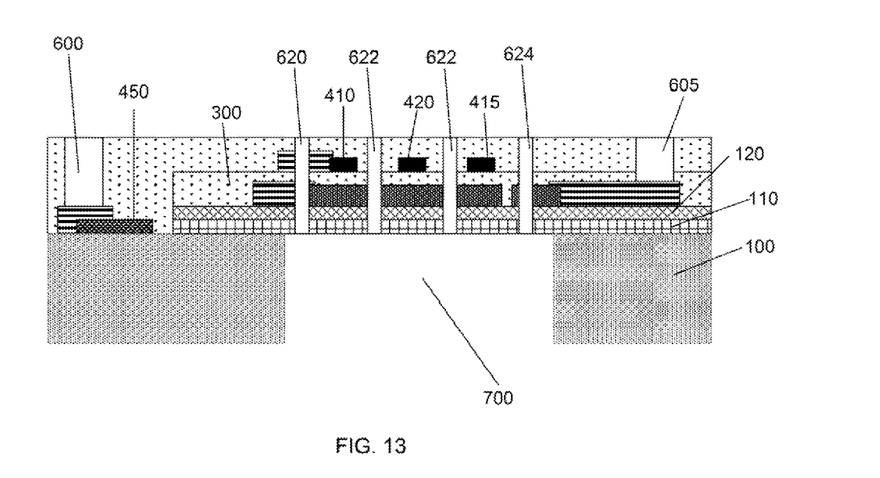
FIG. 13 is the side cross-sectional view of the said invention showing the process of removing the backside passivation films for better thermal contacts for the said silicon mass flow sensor package.

The final process is to form the cavity that provides the thermal isolation and establishes the pressure balance such that the sensors shall not be deformed by the high pressure. FIG. 12 shows the formation of the cavity (700) beneath the membrane structure. This task is preferably done with the deep reactive ion etching that shall stop automatically when the silicon material is completely removed and the reactive ions reach to the silicon oxides that is the bottom layer of the membrane structure. Alternatively the bulk silicon material can also be removed using the standard potassium hydroxide (KOH) solution or tetramethylammonium hydroxide solution (TMAH). Finally the last step of process that forms the final said invention of the silicon mass flow sensor is shown in FIG. 13. The remaining backside silicon nitride ((121) and silicon oxide (111) shall be removed with the standard reactive ion etching and hydrofluoric acid or buffered oxide etching process such that the thermal contact of the hulk silicon to the assembly shall be ensured and the environmental temperature thermistor of the sensing elements can provide the data as precise as possible.

The invention claimed is:

1. A micromachined mass flow sensor with condensation prevention capability comprising:
    a suspending thermally isolated membrane structure on a silicon substrate with a cavity underneath;
    a first heater thermistor is disposed on top of the suspending thermally isolated membrane structure as a membrane heating source which elevates membrane temperature to a certain level;
    a first temperature sensing thermistor surrounding and adjacent to the first heater thermistor is disposed on top of the suspending thermally isolated membrane structure and provides a feedback signal for membrane temperature control; and wherein the first heater thermistor and the temperature sensing thermistor are covered by a layer of dielectric film as an electrical insulation layer;
    a second heater thermistor, an upstream temperature sensing thermistor, and a downstream temperature sensing thermistor being disposed on top surface of the electrical insulation layer; wherein the second heater thermistor is located between, and equidistant from each of, the upstream temperature sensing thermistor and the downstream temperature sensing thermistor and wherein the second heater thermistor serves as a flow medium heating source; and
    a second temperature sensing thermistor being disposed on a non-suspending-membrane region of the silicon substrate; wherein the second temperature sensing thermistor is serving as an ambient temperature sensing thermistor for the flow medium;
    wherein the first heater thermistor and the first temperature sensing thermistor are connected to a control circuit, wherein a feedback signal from the first temperature sensing thermistor is utilized to control and elevate the suspending thermally isolated membrane to a setting temperature, which is above the flow medium's vaporization temperature, to prevent a condensation of the flow medium or a moisture deposition on the suspending membrane's surface;
    wherein the second heater thermistor and the ambient temperature sensing thermistor are connected to a second control circuit, wherein a feedback signal from the ambient temperature sensing thermistor is utilized, to control and elevate the second heater thermistor's temperature to be above the temperature setting of the second heater thermistor; and
    wherein a temperature difference measured between the upstream temperature sensing thermistor and the downstream temperature sensing thermistor is utilized to calculate a mass flow rate.

2. The micromachined mass flow sensor with condensation prevention capability of claim 1 wherein
the temperature sensing thermistors and the heater thermistors are formed by selective materials with high temperature coefficients of resistivity.

3. The micromachined mass flow sensor with condensation prevention capability of claim 1 wherein
a second layer of silicon nitride as a top surface, passivation is deposited on top of the micromachined silicon mass flow sensor; and wherein the second layer of silicon nitride is deposited by plasma enhanced chemical vapor deposition with a thickness ranged from 100 to 500 nm.

4. The micromachined mass flow sensor with condensation prevention capability of claim 1 wherein
the suspending thermally isolated membrane structure is made of polyimide with a thickness from 2 to 8 um for applications requiring a vaporization temperature below 400° C.; and wherein for a higher vaporization temperature higher than 400° C. applications, the suspending thermally isolated membrane structure is made of low stress silicon nitride by a low pressure chemical vaporization deposition (LPCVD) method with a thickness ranged from 0.8 to 2 um.

5. The micromachined mass flow sensor with condensation prevention capability of claim 1 wherein
the first heater thermistor and the second heater thermistor are formed in a pattern of serpentine or spiral to provide as a homogeneous heating source.

6. The micromachined mass flow sensor with condensation prevention capability of claim 1 wherein
the second temperature sensing thermistor provides a feedback data to maintain a constant temperature or a constant power operation mode for the second heater thermistor; wherein the second temperature sensing thermistor's resistance shall be to 30 times larger than the second heater thermistors resistance.

7. The micromachined mass flow sensor with condensation prevention capability of claim 1 wherein
the cavity underneath the suspending thermally isolated membrane is formed by performing a silicon bulk etch selected from the list of: a deep reactive ion etch, potassium hydroxide (KOH) solution etch and a tetramethylammonium hydroxide (TMAH) solution etch.

8. The micromachined mass flow sensor with condensation prevention capability of claim 1 wherein
there are a number of openings on the suspending thermally isolated membrane structure; and wherein the openings can provide a passage for the flow medium to reach down the underneath cavity such that the pressure above and underneath the membrane structure can be balanced.

9. The micromachined mass flow sensor with condensation prevention capability of claim 1 wherein electrical wire bonding pads are provided on the micromachined silicon mass flow sensor away from the suspending thermally isolated membrane structure.

* * * * *